(12) United States Patent
Shakal (10) Patent No.: US 9,045,148 B2
(45) Date of Patent: Jun. 2, 2015

(54) SIMULATED ISOLATION OF LOCOMOTIVES

(71) Applicant: Electro-Motive Diesel, Inc., Lagrange, IL (US)

(72) Inventor: Andrew Joseph Shakal, Bloomer, WI (US)

(73) Assignee: Electro-Motive Diesel, Inc., La Grange, IL (US)

( * ) Notice: Subject to any disclaimer, the term of this patent is extended or adjusted under 35 U.S.C. 154(b) by 0 days.

(21) Appl. No.: 14/037,591

(22) Filed: Sep. 26, 2013

(65) Prior Publication Data

US 2015/0088344 A1    Mar. 26, 2015

(51) Int. Cl.
*G05D 1/02*    (2006.01)
*B61C 17/12*    (2006.01)
*B61L 15/00*    (2006.01)

(52) U.S. Cl.
CPC .............. *B61C 17/12* (2013.01); *B61L 15/0054* (2013.01)

(58) Field of Classification Search
CPC .................................................. B61L 15/0054
See application file for complete search history.

(56) References Cited

U.S. PATENT DOCUMENTS

| | | | |
|---|---|---|---|
| 6,941,218 B2 | 9/2005 | Wolf et al. | |
| 7,021,588 B2 | 4/2006 | Hess, Jr. et al. | |
| 7,618,011 B2 * | 11/2009 | Oleski et al. | 246/167 R |
| 7,941,252 B2 | 5/2011 | Medema et al. | |
| 8,538,608 B2 | 9/2013 | Meltser et al. | |
| 8,761,974 B2 * | 6/2014 | Hawthorne et al. | 701/20 |
| 2008/0082247 A1 | 4/2008 | Hawkins et al. | |
| 2010/0170414 A1 | 7/2010 | Hardin et al. | |
| 2012/0245766 A1 | 9/2012 | Cooper et al. | |
| 2012/0296545 A1 | 11/2012 | Cooper et al. | |
| 2013/0006451 A1 | 1/2013 | Cooper et al. | |
| 2013/0200222 A1 | 8/2013 | Cooper | |

FOREIGN PATENT DOCUMENTS

WO   WO 2012/038272   3/2012

OTHER PUBLICATIONS

U.S. Appl. No. 13/921,643 to John Franklin Kral et al., filed Jun. 19, 2013.

* cited by examiner

*Primary Examiner* — Thomas G Black
*Assistant Examiner* — Ana Thomas
(74) *Attorney, Agent, or Firm* — Finnegan, Henderson, Farabow, Garrett & Dunner, LLP (57) ABSTRACT

A method of controlling one or more locomotives in a consist includes receiving a command and control signal at a controller associated with one of the one or more locomotives, the command and control signal indicative of a desired performance goal for the consist. Operational characteristics of the one locomotive that are factors in achieving the performance goal for the consist are determined. Operational settings for selected ones of the determined operational characteristics for the one locomotive are selectively designated to achieve the performance goal for the consist. Effects of the selectively designated operational settings for the one locomotive may be implemented through the use of control signals to simulate isolation of the one locomotive without physically switching the one locomotive to an isolation mode.

7 Claims, 2 Drawing Sheets

SIMULATED ISOLATION OF LOCOMOTIVES

TECHNICAL FIELD

The present disclosure relates generally to isolation of locomotives in a consist and, more particularly, to simulated isolation of locomotives in the consist.

BACKGROUND

A train consist often includes a lead locomotive and at least one trailing locomotive. The lead locomotive, although generally located at the leading end of the consist, can alternatively be located at any other position along its length. The lead locomotive generates operator and/or autonomous control commands directed to components of the lead and trailing locomotives. A typical locomotive of a consist will have a prime mover power source that includes a diesel engine and an alternator or generator that converts rotational output of the diesel engine into electrical power. The term "prime mover" is generally used to refer to the source of power used primarily for generating a tractive effort used in moving the vehicle. A prime mover power source may also provide power for parasitic or auxiliary loads that do not contribute to the tractive effort, such as air compressors, traction motor blowers, and radiator fans. In some cases an additional auxiliary power source is included on the locomotive to provide the power needed for parasitic or auxiliary loads. Electrical power output by the prime mover power source is used primarily to drive electric traction motors, which convert the electrical power back into rotational output that drives the axles and wheels of the locomotive. A typical locomotive may have two trucks that support the body of the locomotive, with each truck including two or three axles, and each axle being driven by one of the electric traction motors.

Tractive power for the locomotive is supplied by the traction motors. Each traction motor may be an alternating current (AC) traction motor or a direct current (DC) traction motor. The diesel engine drives an alternator/rectifier that provides the prime mover electrical power to an electrical power bus. The prime mover electrical power from the alternator/rectifier is DC power that is then converted to provide electrical power in the appropriate form for the traction motors. When AC traction motors are used, one or more inverters receive the prime mover DC electrical power from the electrical power bus and supply AC power to one or a plurality of locomotive traction motors to propel the locomotive. When DC traction motors are used, DC chopper circuits receive a constant DC electrical power from the electrical power bus on the same locomotive and convert this constant DC electrical power into a variable DC electrical power source appropriate for each DC traction motor. The conversion of DC electrical power for use by DC traction motors includes using a switching technique known as pulse width modulation (PWM). Each of the locomotive traction motors on a locomotive propel the locomotive in response to the prime mover electrical power.

Communication between the lead and trailing locomotives can involve a hard-wired multi-unit (MU) cable, which extends along the length of the consist. An MU cable may include many wires, each capable of carrying a discrete signal used to regulate a different aspect of consist operation. Some of the wires may carry signals indicative of a desired power level for the consist. The MU cable includes several wires that carry signals indicative of different throttle notch settings (predefined discrete power levels). Most of these signals are binary indicators that either provide a voltage or no voltage to the wires. Known methods for controlling a consist of at least first and second locomotives include providing control signals from a lead locomotive over the MU cable to command discrete operating modes for each locomotive in a consist. Such a method is disclosed in U.S. Pat. No. 7,021,588 that issued to Hess, Jr. et al. on Apr. 4, 2006 ("the '588 patent"). The method in the '588 patent includes receiving a control command and determining a power operating mode of the first locomotive and a power operating mode of at least the second locomotive as a function of the control command and an optimization parameter.

Although the system of the '588 patent may have improved communication between multiple locomotives in a consist, the system may still be problematic. In particular, the system may be limited to communicating power operating requirements and control signals to each locomotive in a consist, but without the capability of remotely designating a different operational status for one or more of the locomotives for improved overall consist fuel efficiency and other parameters.

The system and method of the present disclosure solves one or more of the problems set forth above and/or other problems in the art.

SUMMARY OF THE INVENTION

In one aspect, the present disclosure is directed to a method of controlling one or more locomotives in a consist. The method may include receiving a command and control signal at a controller associated with one of the one or more locomotives, with the command and control signal indicative of a desired performance goal for the consist. The method may also include determining which operational characteristics of the one locomotive are factors in achieving the performance goal for the consist. The method may further include selectively designating operational settings for selected ones of the determined operational characteristics for the one locomotive in order to achieve the performance goal for the consist. The effects of the selectively designated operational settings may be implemented for the one locomotive through the use of control signals to simulate isolation of the one locomotive without physically switching the one locomotive to an isolation mode.

In another aspect, the present disclosure is directed to a locomotive consist control system. The control system may include an energy management system. The energy management system may include a plurality of locomotive control computers, with each of the locomotive control computers including an engine control module and an electrical power generator control module. The control system may further include an isolation control module associated with a locomotive of the consist and configured to be communicatively coupled with the energy management system. The isolation control module may be further configured to selectively designate operational settings indicative of one or more operational characteristics of a locomotive that has been physically switched to an isolation mode. The isolation control module may be still further configured to implement the effects of the selectively designated operational settings for the associated locomotive through the use of control signals without physically switching the associated locomotive to an isolation mode.

DETAILED DESCRIPTION

Figure 1:
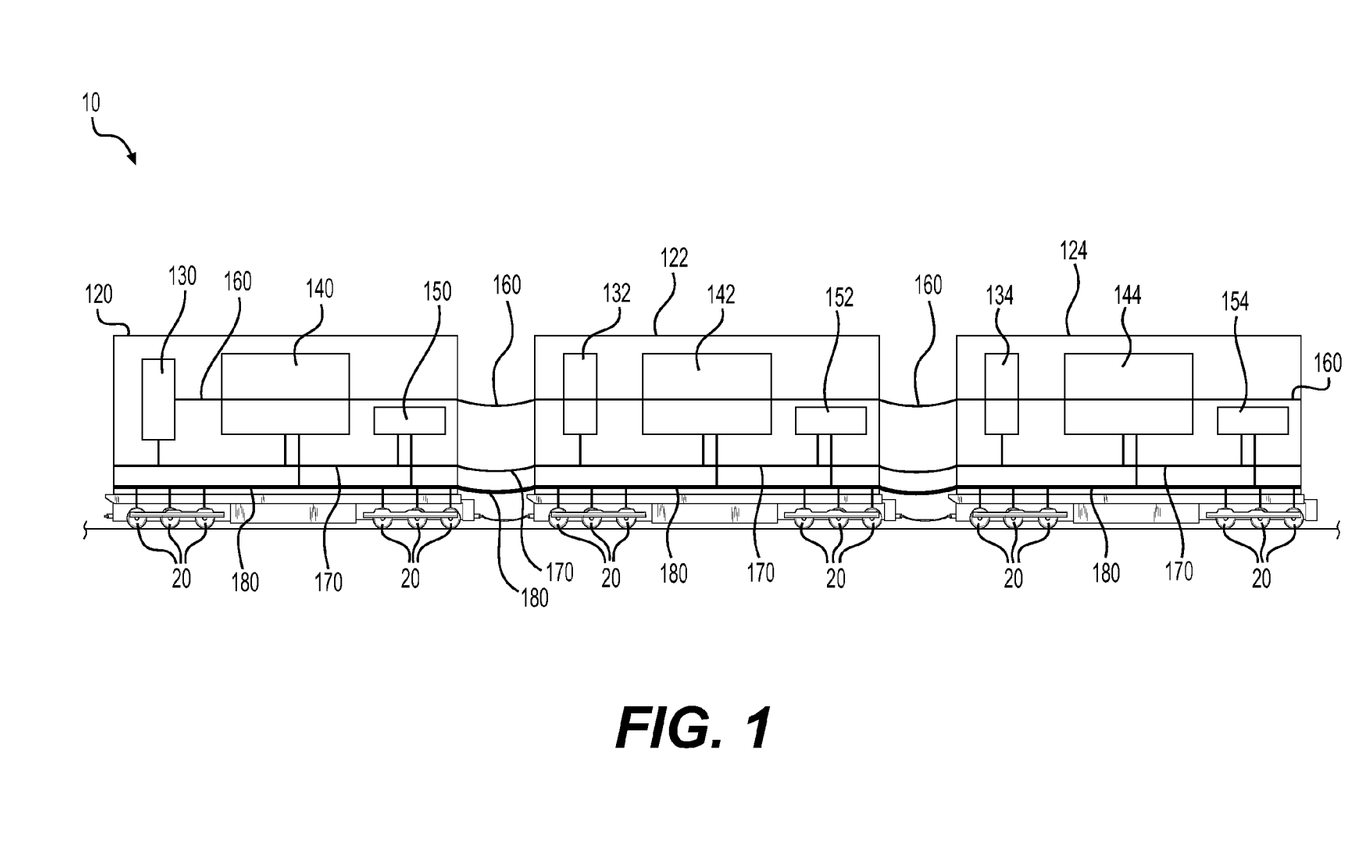
FIG. 1 is a diagrammatic illustration of a system for simulating isolation of one or more locomotives in a consist.

FIG. 1 illustrates an exemplary locomotive consist control system 10 in a train consist having a lead locomotive 120, a first trailing locomotive 122, and a second trailing locomotive 124. In alternative implementations, a locomotive other than locomotive 120 may be the lead locomotive of the consist. In some implementations, additional or fewer locomotives may be included within the consist. Each locomotive 120, 122, 124 may include one or more power sources. In the exemplary implementation illustrated in FIG. 1, each locomotive includes a prime mover power source 140, 142, 144, respectively, and an auxiliary power source 150, 152, 154, respectively. Prime mover power sources 140, 142, 144 may each include a relatively large diesel engine (e.g., a 3300 HP diesel engine) and an alternator or generator. This diesel-electric power source converts the energy derived from diesel fuel into electrical power that may then be provided to an electrical power bus 180. Auxiliary power sources 150, 152, 154 may similarly each include a diesel engine in combination with an alternator or generator. The auxiliary power sources may include diesel engines that are smaller than the diesel engines of the prime mover power sources (e.g., an 800 HP diesel engine), since the auxiliary power sources may provide power primarily for parasitic loads rather than for tractive effort. Alternative implementations may include other types of engines such as gas turbines, and high pressure direct injection (HPDI) engines that use both natural gas and diesel fuel. The alternator included with each diesel-electric prime mover power source 140, 142, 144 and with each auxiliary power source 150, 152, 154 may be coupled with a rectifier to output DC electrical power to electrical power bus 180. Alternative implementations may also include providing AC electrical power to electrical power bus 180. If alternators coupled to each diesel engine output AC electrical power to electrical power bus 180, additional circuitry or controls may be required to synchronize each of the alternators, and the AC power from power bus 180 may require conversion to DC power through rectification, and then additional conversion at each traction motor 20 to supply power in a form required by the traction motors 20. One of ordinary skill in the art will recognize that each locomotive may have more than one prime mover power source, from zero to more than one auxiliary power source, or in some implementations may have neither a prime mover power source nor an auxiliary power source, and may rely on electrical power received from electrical power bus 180 as well as electrical power generated by one or more traction motors 20 operating in a regenerative braking mode.

As shown in FIG. 1, and in accordance with various implementations of this disclosure, each of prime mover power sources 140, 142, 144, and auxiliary power sources 150, 152, 154 may be electrically coupled in parallel to electrical power bus 180 that may span a single locomotive, or may run through all of the locomotives in the consist. Traction motors 20 mounted on trucks of each of the locomotives, and drivingly coupled to the axles of each locomotive, may also be electrically coupled in parallel to electrical power bus 180. The provision of mechanical-electrical power sources on each of the locomotives, all connected in parallel to a common electrical power bus 180 that runs through all of the locomotives 120, 122, 124 in the consist, may enable power sharing between the locomotives. One of ordinary skill in the art will recognize that in various alternative implementations electrical power bus 180 may only extend along each individual locomotive with no interconnection between the locomotives of a consist. Electrical power can be provided by one or more power sources on any one of the locomotives in the consist. Each traction motor 20 on each of the locomotives may also be operated at times in a regenerative braking mode that converts the traction motor from an electrical load into another source of electrical power.

Control computers 130, 132, 134 may be provided on each of locomotives 120, 122, 124, and may be communicatively coupled through a common control bus 170 extending through all of the locomotives to control devices and other network components associated with each of the power sources. Each control computer may include an engine control module, electrical power output control module for an associated alternator or generator, electrical power control modules for associated traction motors, a locomotive control module, and an isolation control module. Each control computer may additionally include an exhaust aftertreatment system (ATS) control module if ATS hardware is included on the associated locomotive. A lead locomotive 120 of the consist may include a lead control computer 130 communicatively coupled over a multi-unit (MU) cable 160 to control computers 132, 134 on each of the trailing locomotives 122, 124, and/or to additional consists of locomotives that may be connected in the train in a trailing position and separated from the lead consist by additional rail cars. Each control computer 130, 132, 134 may include one or more processors, control modules, and various combinations of software, hardware, and/or firmware configured to execute instructions, such as routines, programs, objects, components, or data structures that perform particular tasks or implement particular abstract data types.

Control computers 130, 132, 134 may form part of a communication system that facilitates coordinated control of locomotives 120, 122, 124. Each control computer 130, 132, 134 may include a communication access point for each locomotive 120, 122, 124. Each access point may be connected to one or more wired and/or wireless networks, and used to communicate command signals and/or data between the control computers for each locomotive and various control devices and other network components (e.g., sensors, valves, pumps, heat exchangers, accumulators, regulators, and actuators) that are used to control locomotives 120, 122, 124. Access points at each control computer may be connected to each other via electrical couplings (e.g., via MU cable 160, via a dedicated data link, and/or wirelessly).

Each access point for each control computer may be associated with a processor, a router & bridge, an MU modem, input/output (I/O) ports, a storage, a memory, and any other conventional components known in the art. The I/O ports may facilitate communication between the associated access points for each control computer and one or more of the various other network components. Likewise, the MU modem may facilitate communication between different access points connected to each other via electrical couplings. The router & bridge may be configured to route data packets between each control computer and the I/O ports and/or between each control computer and the MU modem. For example, when a particular access point receives data packets from corresponding I/O ports and/or from the MU modem, the router & bridge may route the data packets to the processor.

The processors at each access point in each control computer may include one or more processing devices, such as microprocessors and/or embedded controllers. The storage may include volatile or non-volatile, magnetic, semiconductor, tape, optical, removable, non-removable, or other type of computer-readable medium or computer-readable storage device. The storage may be configured to store programs and/or other information that may be used to implement one or more of the processes discussed below. The memory may include one or more storage devices configured to store information used by each associated access point.

Each control computer 130, 132, 134 may be configured to control operational aspects of its related rail vehicle. For example, controller 130 of lead locomotive 120 may be configured to control operational aspects of its corresponding prime mover power source 140, auxiliary power source 150, traction motors 20, operator displays, and other associated components. Likewise, control computers 132, 134 of trailing locomotives 122, 124 may be configured to control operational aspects of their corresponding prime mover power sources 142, 144, auxiliary power sources 152, 154, traction motors 20, and associated components.

Each control computer may embody a single microprocessor or multiple microprocessors that include a means for controlling an operation of the associated rail vehicle based on information obtained from any number of network components and/or communications received via the communication access points. Numerous commercially available microprocessors can be configured to perform the functions of the control computers. Each control computer may include a memory, a secondary storage device, a processor, and any other components for running an application. Various other circuits associated with the control computers may include power supply circuitry, signal conditioning circuitry, solenoid driver circuitry, and other types of circuitry.

The information obtained by a particular control computer via the associated access point and/or network components may include performance related data associated with operations of each locomotive 12. For example, sensory data received from various network components may include engine related parameters (e.g., speeds, temperatures, pressures, flow rates), generator related parameters (e.g., speeds, temperatures, voltages, currents), operator related parameters (e.g., desired speeds, desired fuel settings, locations, destinations, braking), liquid fuel related parameters (e.g., temperatures, consumption rates, fuel levels, demand), gaseous fuel related parameters (e.g., temperatures, supply rates, fuel levels), and other parameters known in the art. The performance related data may be data sensed via individual sensors of network components and/or data that is calculated based on assumed or measured parameters.

The information obtained by a particular control computer via the associated access point and/or network components may also include identification data of the other rail vehicles within the same consist. For example, each control computer may include stored in its memory the identification of the particular locomotive with which the control computer is associated. The identification data may include, among other things, a type of locomotive (e.g., make, model, and unique identification number), physical attributes of the associated locomotive (e.g., size, load limit, volume, power output, power requirements, fuel consumption capacity, fuel supply capacity), and maintenance information (e.g., maintenance history, time until next scheduled maintenance, usage history). When coupled with other rail vehicles within a particular consist, each control computer 130, 132, 134 may be configured to communicate the identification data to the other control computers within the same consist. Each control computer, as will be described in more detail below, may be configured to selectively affect operation of its own associated locomotive based at least in part on the obtained identification data associated with the other locomotives of the consist.

In some implementations, control computers 130, 132, 134 may each be configured to affect operation of their associated locomotives based on the information obtained via their associated access points and/or network components, and one or more maps stored in memory. Each of these maps may include a collection of data in the form of tables, graphs, and/or equations.

In some instances, it may be beneficial to export operational information to an offboard entity. In particular, lead locomotive 120 (or another locomotive or rail vehicle of the associated consist) may be equipped with a communication device communicatively coupled with control computer 130. The communication device may be configured to communicate messages wirelessly between control computer 130 and an offboard entity, such as a central dispatch center, service personnel, or wayside station. The wireless communications may include satellite, cellular, infrared, and any other type of wireless communication. The communications may include messages regarding fault conditions, identification of failed components, and/or instructions for the service personnel. Other information may also be transmitted offboard, if desired.

Various energy management protocols implemented by one or more of the control computers may designate one or more periods of time when only one auxiliary power source is operating on only one of the locomotives in the consist to provide electrical power to electrical power bus 180. The electrical power provided to power bus 180 by the one auxiliary power source on one of the locomotives in the consist may provide all the power that is needed during designated periods of time to operate traction motors 20 on any of locomotives 120, 122, 124, and provide power to any parasitic loads such as traction motor fans, onboard air conditioning, air compressors, or other non-tractive loads. These low power demand periods of time may occur, for example, when the train is traveling down a steep grade, and each of traction motors 20 is in a regenerative braking mode. Energy management protocols initiated by one or more of control computers 130, 132, 134 may enable the selective operation of one or more power sources on any or all of the locomotives in the consist. Various implementations of this disclosure may allow for operational situations when any particular locomotive in the consist may be able to obtain an extra boost of power from electrical power bus 180 even though the power sources on the particular locomotive are also operational. A locomotive with a temporarily malfunctioning power source may also be able to continue to meet auxiliary and/or tractive power needs by drawing power from electrical power bus 180. The power sharing arrangement in accordance with various implementations of this disclosure may also allow for all power sources on some of the locomotives to be turned completely off during periods of time when both tractive and auxiliary power demands on each locomotive are being met by power obtained from the common electrical power bus 180.

In some implementations of this disclosure the electrical power provided to electrical power bus 180 by one or more of the power sources on the consist may be controlled to maintain a certain minimum voltage on the electrical power bus at all times. As one non-limiting example, a minimum voltage falling approximately within the range from 600 volts to 1200 volts may be maintained on electrical power bus 180 at all times. One or more of control computers 130, 132, 134 may be configured to receive input data and provide command control signals for operating any of the power sources on any of the locomotives in the consist to maintain this minimum voltage on electrical power bus 180. Input may be provided to the control computers from operators onboard the locomotives, or from other offboard command control centers, dispatch centers, or wayside stations. Additional signals received by the control computers may include signals indicative of operating parameters for each traction motor 20, operating parameters and power generating capacities of each alternator or generator, duty cycles for each alternator or generator, track profile information including track grade, curvature, elevation, tunnels, speed limits, road crossings, and switchyards, power available on electrical power bus 180, trip plan information, and actual power utilization rates on each locomotive for both tractive effort and other parasitic or auxiliary loads.

The control computers may be configured to process the information received from various sensors and other inputs providing the data discussed above and maintain the minimum voltage on electrical power bus 180 by controlling one or more power sources as needed. Maintenance of a minimum voltage on electrical power bus 180 at all times may provide a benefit in that ancillary power on any of the locomotives for air compressors, traction motor blowers, radiator fans, and other parasitic loads is available from electrical power bus 180 at all times. Furthermore, maintenance of at least a minimum voltage on electrical power bus 180 may help to reduce power losses over the power bus by allowing for a lower current through the bus. Because of the relationships between power (P), voltage (V), current (I), and resistance (R), in a power bus with a resistance R, where $V=IR$, $P=IV$, and accordingly $P=I^2R$, the power loss over the power bus may be referred to as an $I^2R$ loss. A higher potential or voltage (V) in a power bus having a substantially constant resistance (R) may result in substantially the same amount of electrical power (P) transferred through the bus at a lower current (I). A lower current translates into lower power losses, and may also enable the use of an electrical cable with a smaller cross sectional area, which may further reduce costs by cutting down on the amount of copper needed to produce electrical power bus 180.

One or more control computers on any of the locomotives may also be configured to transfer excess electrical energy from electrical power bus 180 to various energy storage devices. One or more of the locomotives in the consist may include an energy storage device, which may include electrical storage batteries, capacitors, flywheels, accumulators, or other mechanisms for storing energy.

The alternators or generators included with each diesel-electric power source may be, for example, alternating current (AC) induction generators, permanent-magnet generators, AC synchronous generators, or switched-reluctance generators. In one implementation, each alternator or generator may include multiple pairings of poles, each pairing having three phases arranged on a circumference of a stator to produce an alternating current with a frequency of about 50-60 Hz. Electrical power produced by each alternator may be rectified to convert the power to DC power, and the DC electrical power may be supplied to electrical power bus 180.

DC traction motors 20 may be generally operable to receive DC power from electrical power bus 180 that may be pulse width modulated by DC chopper circuits. A DC chopper circuit may include a high speed switch such as an insulated gate bipolar transistor (IGBT) and/or a thyristor, and a free-wheeling diode. The free-wheeling diode may help to eliminate any sudden voltage spikes that may occur across an inductive load such as may be present in traction motor 20 when supply voltage to traction motor 20 is suddenly reduced or removed. AC traction motors may be used in alternative implementations where the DC power from electrical power bus 180 is converted for use by the AC traction motors using inverters. Traction motors 20 may additionally be operable to receive mechanical power from the wheels and axles they are mechanically coupled to and use the mechanical power to generate electrical power in a regenerative braking mode, if desired.

As traction motors 20 on each locomotive 120, 122, 124 and any auxiliary loads on the locomotives draw more or less electrical power from electrical power bus 180, the voltage of the electrical power bus may fall or rise proportionally. A control computer associated with a locomotive may include a power source control module and associated throttle position sensors and voltage or current sensors. Lead control computer 130 on lead locomotive 120, or any of the control computers on any of the lead or trailing locomotives may be configured to affect an output of each diesel engine and alternator on each locomotive in response to a detected change in electrical characteristics of electrical power bus 180. As traction motors 20 on any one of the locomotives in the consist draw more power from electrical power bus 180 and the corresponding voltage of the power bus begins to drop below a minimum threshold, any one or more of the control computers may be configured to receive signals from a power bus electrical characteristics sensor indicative of these changes in voltage or current. Upon making a determination that the available voltage has dropped below a minimum desired voltage on electrical power bus 180, one or more control computers may be configured to transmit control signals to any of the power sources on any of the locomotives in the consist.

The tasks performed by one or more of control computers 130, 132, 134 may also be performed by remote processing devices that are linked through a communications network. In a distributed computing environment, program modules may be located in both local and remote computer storage media including memory storage devices. These local and remote computing environments may be contained entirely within the locomotive, or adjacent locomotives in a consist, or offboard in wayside or dispatch centers where wireless communication may be used. This method and system may be applicable to sharing power and communicating data between any of the linked locomotives 120, 122, 124.

As shown in FIG. 1, control computers 130, 132, 134 may be interconnected by a dedicated serial bus such as control bus 170. The control bus 170 may be separate from, or incorporated into a typical communication link between the locomotives such as a standard 27 pin, multi-unit (MU) cable 160. In some implementations, control of electrical power being shared between locomotives of the consist through electrical power bus 180 may require a more secure protocol than other data being transferred over MU cable 160. Alternatively or in addition, it may be desired for other reasons to keep control signals related to the transfer of electrical power along electrical power bus 180 separate from the other multiplex control signals being transferred over MU cable 160.

Each control computer may be further configured to receive other information or data relevant to the instantaneous operating performance of each locomotive in the consist, such as current fuel levels for each locomotive, ambient conditions at each locomotive, active faults occurring at any locomotive, wear levels of various components on each locomotive, and track conditions being experienced by each particular locomotive. One or more control computers may be still further configured to include a system that may provide information on upcoming conditions such as track conditions and grade over the next 50 miles. Such a system may acquire data from GPS receivers and/or maps of the upcoming areas, and provide additional information to a control computer that may be used in determining specific energy management protocols for controlling the various power sources on each of the locomotives.

The control computers may be configured to control the prime mover power sources and the auxiliary power sources of each locomotive 120, 122, 124, and other operating parameters based on input from a vehicle operator or other command control center as well as input received from various sensors. Information may be received from a plurality of engine sensors, fuel level sensors, electrical power output sensors, voltage sensors, current sensors, and/or exhaust aftertreatment (ATS) sensors. Each control computer may be configured to send control signals to a plurality of engine actuators, electrical power actuators or controls such as automatic voltage regulators associated with the alternators, traction motor controllers, and/or ATS actuators on each locomotive. As one example, engine sensors and/or ATS sensors may include exhaust gas sensors located in, or coupled with one or more exhaust manifolds for each of one or more engines provided with each locomotive, exhaust temperature sensors located upstream and/or downstream of various emission control devices, and intake regulated emissions level sensors. Various other sensors such as particulate sensors for a diesel particulate filter (DPF), additional pressure, temperature, flow, air/fuel ratio, and alternate regulated emissions sensors may be coupled to various locations on or in the one or more engines provided with each locomotive. As another example, engine actuators and/or ATS actuators may include fuel injectors, hydrocarbon (HC) dosing injectors, reductant injectors used in conjunction with a selective catalytic reduction (SCR) process to reduce NOx levels, and throttle or notch controls. Other actuators for controlling mechanical and electrical components or flows, such as a variety of additional valves, voltage regulators, contactor or electrical relay actuators, and current regulators may be coupled to various locations in each of one or more engines, alternators, the electrical power bus, and traction motors associated with each of the locomotives.

One or more control computers may be further configured to store data and information about each of the power sources on each of the locomotives in a memory device to assist communication with other control computers located onboard the consist. A control computer may also be configured to use this data and information to assist in a determination of which power sources on the consist may be best utilized at any particular time for maintaining a desired minimum voltage on the electrical power bus, for reducing overall fuel consumption of the consist, and for reducing overall emissions produced by the consist. One or more control computers may also store data and information on the electrical power output characteristics of the various alternators or generators, and electrical power consumption characteristics of traction motors 20, and maintain this information in continually updated logs of the performance characteristics of the various electric drive components on each locomotive.

Input devices may be located onboard a lead locomotive of the consist, and may include any component or components configured to transmit signals to one or more components of the consist. In some implementations, an input device may include components that an operator can manipulate to indicate whether the operator desires propulsion of the consist by traction motors 20 and, if so, in what direction and with how much power the operator desires traction motors 20 to propel the consist. For example, an input device may include an operator input device with which an operator may indicate a desired consist performance to be received by a lead control computer. In an alternative implementation, an input device may be a computer-based system that may allow the consist to operate automatically without requiring an operator. One or more of the control computers may include circuitry and/or algorithms that enable the one or more control computers to receive and process information in real time from all locomotives, operator inputs, sensors, databases, look-up tables, and/or maps. The control computers may also be configured to determine from this information exactly what power outputs should be requested at any particular time from each of the power sources on each of the locomotives in the consist. Goals may include optimization of fuel efficiency for the entire consist, reduction of emissions, re-allocation of load requirements, equalization of fuel consumption, or precise control of the electrical power outputs of each locomotive as a function of operating parameters, constraints, and objectives. The ability to share power between locomotives may significantly increase the flexibility of the entire system in meeting power demands while improving performance and achieving other desired operating goals.

To facilitate effective control of the supply of electricity from electrical power bus 180 to traction motors 20 on each locomotive, one or more of control computers 130, 132, 134 may be configured to monitor various aspects of engine operation, generator operation, traction motor operation, and/or transmission of electricity within the system. For example, the control computers may monitor engine speed, engine fueling, and/or engine load for their respective engines. Likewise, the control computers may be configured to monitor the voltage, current, frequency, and/or phase of electricity generated by their respective alternators and conveyed over electrical power bus 180. Additionally, the control computers may be configured to monitor the electricity supplied to and/or consumed by traction motors 20, a torque output of traction motors 20, wheel or axle rotational speeds, individual wheel slippage, and/or total tractive forces of each locomotive. The control computers may also employ sensors and/or other suitable mechanisms to monitor the operating parameters, and determine whether there are any active faults. For example, one or more control computers may monitor an actual performance of the consist with one or more sensors, where the actual performance of the consist may include total electrical power consumed by all traction motors 20 during a particular time period or travel distance.

Figure 2:
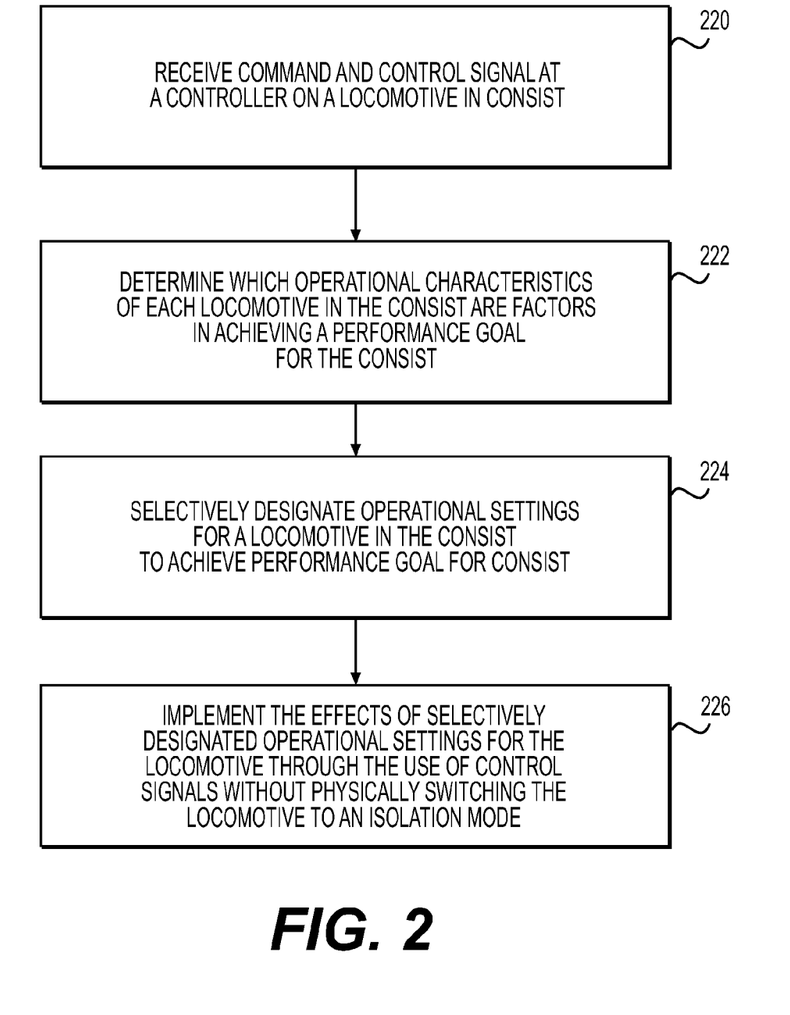
FIG. 2 is a flow chart depicting an exemplary disclosed method that may be performed by the system of FIG. 1.

FIG. 2 illustrates an exemplary implementation of a method that may be performed by the system shown in FIG. 1. FIG. 2 will be discussed in more detail in the following section to further illustrate the disclosed concepts.

INDUSTRIAL APPLICABILITY

The disclosed system and method for simulating the isolation of particular locomotives in a consist may enable operation of the various power sources throughout the consist in ways that may improve overall fuel economy, reduce emissions, increase engine life, and reduce noise. The disclosed system and method may also facilitate efficient and effective compliance with a wide range of power demands and tractive efforts called upon under a wide variety of conditions experienced by the consist.

In situations where fewer than all of the locomotives in the consist are required to meet desired performance characteristics, one or more control computers may automatically improve fuel efficiency for the consist by transmitting a command to one or more other control computers, instructing the associated one or more locomotives to virtually isolate itself or themselves. In an "isolation" mode, a locomotive may essentially take itself electrically offline as a result of the command received from a lead control computer. Traditional isolation of a trailing locomotive has generally required activation of a physical switch to put the trailing locomotive into isolation mode.

Physically switching a locomotive into isolation mode results in physical changes to circuit pathways, and implementation of certain operational characteristics that cannot be varied as long as the locomotive remains physically in isolation mode. This activation of a physical switch may not provide a desired flexibility in selectively designating operational settings for each of the locomotives in the consist in order to achieve the particular performance goal for the consist. In accordance with various implementations of the present disclosure, the effects of the selectively designated operational settings may be implemented for a locomotive through the use of control signals without physically switching the locomotive to an isolation mode. As a result, the isolation mode switch on the locomotive may be left in a "run" position. One or more of the effects that would have been implemented by switching the locomotive into isolation mode may be achieved through the use of control signals that simulate isolation rather than physically switching the locomotive to an isolation mode.

In isolation mode a trailing locomotive may no longer respond to throttle or power commands from a lead control computer, and may instead receive start-up and shut-down commands from an Automatic Engine Start-Stop (AESS) system on the trailing locomotive. In various non-limiting implementations, the AESS system may monitor conditions on the trailing locomotive such as the electrical charge in batteries, air pressure in brake line reservoirs, and engine temperatures. Based on at least these monitored local conditions, the AESS system may start-up and shut-down the trailing locomotive completely independently from any command received from a lead computer, as independently determined by the AESS system to maintain desired local conditions on the isolated locomotive. The transfer of electrical power over common electrical power bus 180, which is maintained at or above a set minimum voltage may also enable an isolated locomotive to continue to draw all of the auxiliary power it may need from electrical power bus 180. Additional effects of the operational characteristics that would be implemented on a locomotive in isolated mode may include differences in the way active faults are treated. Certain detected active faults may not be considered to be important enough to report when a particular locomotive is in isolated mode. Alarm indicators for active faults in a trailing locomotive that would normally be conveyed to an operator in the lead locomotive may not be transmitted while the trailing locomotive is physically isolated. As one non-limiting example, an active fault indicative of the failure of a locomotive to respond to a throttle command would most likely be ignored when the locomotive is in isolated mode. A physically isolated locomotive may also treat engine speed-up and slow-down requests differently, or may ignore such requests completely, as compared to a locomotive in run mode.

Simulated isolation of a locomotive in accordance with various implementations of this disclosure may enable the selective designation of operational settings for the locomotive that will best achieve the particular performance goals for the consist. The effects of the selectively designated operational settings may be implemented for the locomotive through the use of control signals without physically switching the locomotive to an isolation mode. In various exemplary implementations of simulated isolation of the locomotive, only certain effects characteristic of a physically isolated locomotive may be implemented. One example may include rendering the simulated isolated locomotive unresponsive to throttle/load requests transmitted over the MU cable, while still providing notification of active faults detected on the locomotive that would normally be ignored when the locomotive is physically isolated. Another example may include rendering the simulated isolated locomotive only unresponsive to throttle/load requests that fall within a specific range.

Undesired emissions may also be minimized by powering a minimal set of locomotives. For example, emissions produced by a train with several locomotives or locomotive consists may be reduced by powering a minimal set of locomotives at a higher power setting while putting the remaining locomotives into simulated isolation mode, idle, un-powered standby, or an automatic engine start-stop (AESS) mode. This is due, in part, because at lower power settings such as traditional throttle notch settings 1-3, exhaust emissions aftertreatment devices (e.g., catalytic converters) located on the locomotives may be at temperatures below which these systems' operations are optimal. Therefore, using the minimum number of locomotives or locomotive consists to achieve mission objectives, while operating at high power settings may allow the exhaust emission treatment devices to operate at optimal temperatures for further reducing emissions.

The train load may be estimated based on information such as is typically disclosed in a train makeup docket. The train makeup docket may be contained in the control computer associated with a particular locomotive, and may include such information as the number of cars, weight of the cars, content of the cars, and age of the cars. In alternative implementations the train load may be estimated using historical data, such as but not limited to prior train missions making the same trip, and similar train car configurations. With respect to engines used in other applications, identifying a mission time and/or duration for the diesel power system may be equated to defining the mission time within which the engine configuration is expected to accomplish the mission. A determination is made about a minimum total amount of power required based on the train load. The locomotive is selected to satisfy the minimum required power while yielding improved fuel efficiency and/or minimized emission output. The locomotive may be selected based on a type of locomotive (based on its engine) needed and/or a number of locomotives (based on a number of engines) needed. Similarly, with respect to diesel engines used in other power applications, such as but not limited to marine, off-highway vehicles (OHV), and stationary power stations, where multiple units of each are used to accomplish an intended mission unique for the specific application, the type of power system and a number of power systems may be selected based on a mission objective.

Towards this end, a trip mission time determinator may be used to determine the mission time, based on information such as weather conditions and track conditions. The locomotive makeup may be based on types of locomotives needed, such as based on power output, and/or a minimum number of locomotives needed. For example, based on the available locomotives, a selection is made of those locomotives that just meet the total power required. As an example, if ten locomotives are available, a determination of the power output from each locomotive may be made. Based on this information, the fewest number and type of locomotives needed to meet the total power requirements may be selected. For example the locomotives may have different horse power (HP) ratings or starting tractive effort (TE) ratings. In addition to the total power required, the distribution of power and type of power in the train can be determined. For example, to limit the maximum coupler forces on heavy trains, the locomotives may be distributed within the train. Another consideration is the capabilities of any particular locomotive based on its age, model type, or other factors.

In an alternative implementation, the selection of locomotives may not be based solely on reducing a number of locomotives used in a train. For example, if the total power requirement is minimally met by five of the available locomotives when compared to also meeting the power requirement by the use of three of the available locomotives, the five locomotives may be used instead of the three. In view of these options, a minimum number of locomotives may be selected from a sequential (and random) set of available locomotives. Such an approach may be used when the train is already compiled and a decision is being made at run time and/or during a mission wherein the remaining locomotives are not used to power the train, or are placed into simulated isolation as discussed in further detail below. While compiling the train, if the train requires backup power, an incremental locomotive, or locomotives, may be added. However this additional locomotive may be placed into simulated isolation to minimize fuel use, emissions output, and power variation, but may be used to provide backup power in case an operating locomotive fails, and/or to provide additional power to accomplish the trip within an established mission time. The isolated locomotive may be put into an AESS mode to minimize fuel use while having the locomotive be available when needed. In various implementations, if a backup, or isolated, locomotive is provided, its dimensions, such as weight, may be taken into consideration when determining the train load.

Thus, determining the minimum power needed to power the train may occur at train run time and/or during a run (or mission). In this instance, once a determination is made as to optimized train power and the locomotives or locomotive consists in the train are identified to provide the requisite power needed, the additional locomotive(s) not identified for use may be put into a simulated isolation mode. The simulated isolation mode may provide some or even all of the effects of placing the additional locomotives into a physically isolated mode. As one non-limiting example, a simulated isolation mode may render the locomotive non-responsive to throttle commands received from a lead locomotive. However, the simulated isolation mode may differ from a physically isolated mode in that the affected locomotive may not have the AESS mode enabled. This feature may allow the locomotive in simulated isolation mode to shut down its prime mover power sources even before all of the conditions normally necessary to enable AESS mode are met. The ability to place selected locomotives into a simulated isolation mode may provide the added flexibility of only implementing selectively designated operational settings normally associated with a physically isolated locomotive.

In certain implementations, the total mission run may be broken into a plurality of sections, or segments. Based on the amount of time taken to complete any segment, the backup power, provided by an isolated locomotive, may be made available in case incremental power is needed to meet the trip mission objective. The isolated locomotive may be utilized for a specific trip segment to get the train back on schedule and then switched off for subsequent segments. Thus, in operation, lead locomotive 120 may put one or more of trailing locomotives 122, 124 into a simulated isolation mode until the power is needed. This may be accomplished by use of wired or wireless modems or communications from the operator, usually on the lead locomotive, to the isolated locomotive. In various implementations, the initial setup of the locomotives, based on train load and mission time, may be updated by a trip optimizer, and adjustments to the number and type of powered locomotives may be made.

One or more control computers 130, 132, 134 may be further configured to receive inputs from various engine sensors, electrical sensors, ATS sensors, and locomotive sensors, process the data, and trigger the engine actuators, generator electrical power control actuators, traction motor actuators, ATS actuators, and locomotive actuators in response to the processed input data. The one or more control computers may be configured to take these actions based on instructions, look-up tables, one or more maps, or programmed code or algorithms corresponding to one or more routines. For example, a control computer may be configured to determine a locomotive trip plan including locomotive power outputs and brake settings, engine operating parameters, and the precise levels of electrical power output expected from each generator on each locomotive based on the locomotive operating conditions and current environmental conditions for each locomotive.

In one example, a control computer may be configured to determine a trip plan including precise electrical power output requirements for each locomotive based on the current voltage and/or current in electrical power bus 180, individual engine operating conditions, generator electrical power output capabilities, traction motor electrical power requirements, age of the equipment, and operator preferences. Individual locomotives and/or one or more consists of locomotives in a train may be operated in accordance with particular power duty cycles that specify the time spent at each power level or range of total power outputs as a fraction of total time of operation. In various implementations, the diesel engines of prime mover power sources 140, 142, 144, and auxiliary power sources 150, 152, 154 may be most efficient and achieve best possible brake specific fuel consumption at or near full power. Accordingly, for these implementations, a control computer may provide commands for electrical power output from each of the power sources that will result in the engines on each locomotive operating close to full power for as large a portion of total operating time of each engine as possible. Based on possible differences between the trip plan's time in a particular power duty cycle and a reference duty cycle (such as an EPA duty cycle), one or more control computers may reconfigure the trip plan. For example, based on the differences, a particular control computer may be configured to readjust parameters set during trip planning. These parameters may include electrical power output requirements for each alternator, electrical power consumption or draw by each traction motor 20, fuel injection settings for each engine, ignition timing, and other engine operating parameters and exhaust aftertreatment parameters. In one example, as an actual duty cycle for one or more of the locomotives starts deviating from a reference duty cycle, thereby possibly leading to increased exhaust emissions or reduced fuel efficiency, a control computer may provide instructions to readjust electrical power output requirements for one or more locomotives for a trip plan that imposes fuel economy and exhaust emissions as constraints. Any one or more of the control computers may be configured to customize a trip plan. The trip plan may be modified during a particular trip based on network data and/or non-network data received from one or more of an operator, remote dispatch center, onboard sensors including engine operating sensors, electrical sensors, and locomotive sensors, and wayside sensors including hot box detectors, impact detectors, and hot wheel detectors.

In various alternative implementations, operator input may include a total wattage power output goal, a fuel efficiency goal, an emissions level goal, a tractive power goal, or a performance goal for each of the locomotives or for the consist as a whole. Any one or more of the control computers may be configured to determine the electrical power output desired from each of the power sources on each of the locomotives at any particular time, or over any particular period of time, in order to improve fuel efficiency for the entire consist, reduce emissions, re-allocate load requirements, or otherwise vary the power outputs of each locomotive as a function of operating parameters, constraints, and objectives. This determination may be made by calculating from one or more algorithms, or by reference to a look-up table, one or more maps, or other data obtained over a network or stored in memory.

The transfer of electrical power from one power generating locomotive to another in the consist along a common electrical power bus running through all of the locomotives may provide flexibility in the operation of the various power sources that would not be available when simply transferring control signals between the locomotives. The disclosed power sharing system and ability to selectively simulate isolation of particular locomotives may be applicable to any number of vehicles and/or different types of vehicles having electrical power drive in various arrangements. For example, the consist could include additional or fewer locomotives, passenger cars, freight cars, tanker cars, or other rail or non-rail vehicles having electrical power drive. The combination of power sharing over a common electrical power bus, and the ability to simulate isolation of particular locomotives, may allow implementations that would not be possible with physical isolation of a locomotive. The simulated isolation may implement only some of the effects of selectively designated operational settings associated with a physically isolated locomotive. As one example, a control signal indicative of an increase in a throttle notch setting for a locomotive that is in simulated isolation may not result in any increased power output from a prime mover engine on the locomotive. This may enable conservation of fuel on the locomotive in simulated isolation. However, the effects of reduced fuel consumption by the locomotive in simulated isolation may be partially offset by drawing more electrical power from the common electrical power bus in order to provide the same torque output at the traction motors for the locomotive in simulated isolation. This may in turn result in increased fuel consumption by another locomotive in the consist. However, a determination may be made by a controller on a locomotive that the prime mover power source on the locomotive to be placed into simulated isolation is less fuel efficient in a particular power range or under other circumstances than another locomotive in the consist. In another alternative implementation, simulated isolation of a locomotive may be implemented by continuing to respond to throttle/load requests received over MU cable 160 as long as those throttle requests are less than a particular notch setting. The controller implementing simulated isolation for a locomotive may interpret throttle notch settings above a designated setting as requiring more electrical power to be provided to the simulated isolated locomotive from the common electrical power bus. As a result, the prime mover engine on the locomotive in simulated isolation may not be requested to output power above a designated amount. Other alternative implementations of simulated isolation of a locomotive may be characterized by treating any active faults on the locomotive exactly the same as a locomotive that is not isolated.

At step 220 in FIG. 2, any one or more of the control computers may receive a command and control signal. The command and control signal may be indicative of a performance goal for the consist of locomotives. The total power output requirement for the consist may be determined based on a plurality of inputs including operator inputs, inputs from a command and control center, trip plan data, data regarding the coupling of additional freight cars and/or locomotive consists to the train, changes in tractive effort required by track profile conditions or weather conditions, and condition or age of the various engines, electrical power drives, and other components on the train.

At step 222, the one or more control computers may determine which operational characteristics of each locomotive in the consist are factors in achieving the performance goal for the consist. These operational characteristics may include throttle response, engine output power, electrical power output, fuel consumption, and emissions, amongst other characteristics. Any one or more of the control computers may determine an amount of available power on a common electrical power bus running between all of the locomotives in the consist. This determination may be made from signals received from power bus electrical characteristic sensors such as voltage sensors and current sensors. The control computers may also take into consideration upcoming conditions such as changes in track profile, weather, anticipated loading, or other factors that may affect the power draw on the electrical power bus.

At step 224, the one or more of the control computers may selectively designate operational settings for their associated locomotives to achieve the performance goal for the consist. This selective designation of operational settings may take into consideration operational parameters for any or all of the locomotives in the consist, as well as additional sensory inputs and stored historical or empirical data. The selectively designated operational settings may include throttle settings, speeds, wheel temperatures, brake settings, rate of fuel consumption, power output, alarm indicators for active faults, and the like.

At step 226, the one or more control computers may implement the effects of the selectively designated operational settings for the associated locomotives through the use of control signals without physically switching the associated locomotives to an isolation mode. As discussed above, simulated isolation through the use of control signals enables the selection of only the particular effects of physical isolation of a locomotive that contribute to achieving the performance goals for the consist. In various disclosed implementations, a controller placing an associated locomotive into simulated isolation may determine that the performance goals of the consist are best met by rendering the isolated locomotive unresponsive to throttle commands above a certain limit. Alternatively, the locomotive in simulated isolation may only respond to throttle commands above a certain limit. In still further alternative implementations, a locomotive in simulated isolation may respond to throttle notch signals by engaging contactors to obtain a different voltage from the generator/alternator on the locomotive. But the simulated isolated locomotive may change the way in which the engine speeds-up or slows-down to accommodate the change in electrical load. For example, a control computer for a locomotive that is in simulated isolation mode may command a combination of contactors for the generator that places the generator windings into a series configuration, resulting in a higher output voltage. The prime mover engine for the locomotive in simulated isolation may only be allowed to speed up to accommodate this higher voltage request over a longer period of time than would be the case when the locomotive is not isolated. In other examples, the control computer may only command changes to the output voltage of the generator for throttle notch settings above a certain limit, or below a certain limit. Engine speed-up and slow-down in response to different throttle notch settings may also be changed at different rates when a locomotive is in simulated isolation mode than when it is in regular run mode. Simulated isolation can therefore provide more flexibility in adapting to varying conditions and operational characteristics.

It will be apparent to those skilled in the art that various modifications and variations can be made to the disclosed simulated isolation system. Other implementation will be apparent to those skilled in the art from consideration of the specification and practice of the disclosed methods. It is intended that the specification and examples be considered as exemplary only, with a true scope being indicated by the following claims and their equivalents.

What is claimed is:

1. A method of controlling one or more locomotives in a consist, the method comprising:
    receiving a command and control signal at a controller associated with one of the one or more locomotives, the command and control signal indicative of a desired performance goal for the consist;
    determining which operational characteristics of an associated locomotive are factors in achieving the performance goal for the consist;
    selectively designating operational settings for selected ones of the determined operational characteristics for the associated locomotive in order to achieve the performance goal for the consist; and
    implementing effects of the selectively designated operational settings for the associated locomotive through the use of control signals to simulate isolation of the associated locomotive without physically switching the associated locomotive to an isolation mode, wherein simulating isolation of the associated locomotive includes one or more of:
        a) rendering the associated locomotive unresponsive to throttle notch requests transmitted to the associated locomotive, while still providing notification of active faults detected on the associated locomotive that would normally be ignored when the associated locomotive is physically isolated;
        b) responding to a request for an increase in a throttle notch setting for the associated locomotive by drawing more electrical power from a common electrical power bus extending between the one or more locomotives in the consist without increasing power output of a prime mover engine on the associated locomotive;
        c) responding to a throttle notch request at the associated locomotive only if the requested throttle notch setting is above a predefined limit;
        d) responding to a throttle notch request at the associated locomotive only if the requested throttle notch setting is below a predefined limit; and
        e) commanding at least one of engine speed-up and engine slow-down in response to different throttle notch settings at different rates when the associated locomotive is in simulated isolation mode than when it is in a regular run mode.

2. The method of claim 1 wherein receiving a command and control signal at the controller associated with one of the locomotives includes one or more of receiving input from an operator onboard one of the locomotives, receiving input from a command control center, and receiving input from data indicative of a trip plan for the consist.

3. The method of claim 1, wherein implementing the effects of the selectively designated operational settings for the associated locomotive includes:
    causing a prime mover generator on the associated locomotive to change output voltage in response to a throttle command; and
    changing output power from an associated prime mover engine to accommodate the changed output voltage at a slower rate than when the associated locomotive is not isolated.

4. A locomotive consist control system, comprising:
    an energy management system, the energy management system including:
        a plurality of locomotive control computers, with each of the locomotive control computers including an engine control module, and an electrical power generator control module; and
    an isolation control module associated with a locomotive of the consist and configured to be communicatively coupled with the energy management system, the isolation control module being further configured to:
        selectively designate operational settings indicative of one or more operational characteristics of a locomotive that has been physically switched to an isolation mode; and
        implement effects of the selectively designated operational settings for the associated locomotive through the use of control signals to simulate isolation of the associated locomotive without physically switching the associated locomotive to an isolation mode, wherein simulating isolation of the associated locomotive includes one or more of:
            a) rendering the associated locomotive unresponsive to throttle notch requests transmitted to the associated locomotive, while still providing notification of active faults detected on the associated locomotive that would normally be ignored when the associated locomotive is physically isolated;
            b) responding to a request for an increase in a throttle notch setting for the associated locomotive by drawing more electrical power from a common electrical power bus extending between at least two locomotives in the consist without increasing power output of a prime mover engine on the associated locomotive;
            c) responding to a throttle notch request at the associated locomotive only if the requested throttle notch setting is above a predefined limit;
            d) responding to a throttle notch request at the associated locomotive only if the requested throttle notch setting is below a predefined limit; and
            e) commanding at least one of engine speed-up and engine slow-down in response to different throttle notch settings at different rates when the associated locomotive is in simulated isolation mode than when it is in a regular run mode.

5. The locomotive consist control system of claim 4 wherein at least one of the locomotive control computers is configured to receive a command and control signal from at least one of an operator onboard one of the locomotives, a command control center, and data indicative of a trip plan for the consist.

6. The locomotive consist control system of claim 4, wherein the isolation control module is configured to implement the effects of the selectively designated operational settings for the associated locomotive including:

causing a prime mover generator on the associated locomotive to change output voltage in response to a throttle command; and changing output power from an associated prime mover engine to accommodate the changed output voltage at a slower rate than when the associated locomotive is not isolated.

7. A locomotive consist comprising:

a plurality of locomotives;

at least one locomotive control computer associated with each of the plurality of locomotives; and an isolation control module associated with at least one of the at least one locomotive control computers, the isolation control module being configured to:

selectively designate operational settings that are to be implemented for an associated locomotive through the use of control signals indicative of one or more operational characteristics that would be achieved if the associated locomotive were physically switched to an isolation mode; and implement effects of the selectively designated operational settings for the associated locomotive through the use of control signals to simulate isolation of the associated locomotive without physically switching the associated locomotive to an isolation mode, wherein simulating isolation of the associated locomotive includes one or more of:

a) rendering the associated locomotive unresponsive to throttle notch requests transmitted to the associated locomotive, while still providing notification of active faults detected on the associated locomotive that would normally be ignored when the associated locomotive is physically isolated;

b) responding to a request for an increase in a throttle notch setting for the associated locomotive by drawing more electrical power from a common electrical power bus extending between at least two locomotives in the consist without increasing power output of a prime mover engine on the associated locomotive;

c) responding to a throttle notch request at the associated locomotive only if the requested throttle notch setting is above a predefined limit;

d) responding to a throttle notch request at the associated locomotive only if the requested throttle notch setting is below a predefined limit; and e) commanding at least one of engine speed-up and engine slow-down in response to different throttle notch settings at different rates when the associated locomotive is in simulated isolation mode than when it is in a regular run mode.

* * * * *